United States Patent [19]

Lin

[11] 4,435,549
[45] Mar. 6, 1984

[54] N-CYANO AMIDE COMPOSITIONS AND ADDUCTS THEREOF

[75] Inventor: Shiow-Ching Lin, Columbia, Md.
[73] Assignee: W. R. Grace & Co., New York, N.Y.
[21] Appl. No.: 460,187
[22] Filed: Jan. 24, 1983
[51] Int. Cl.$^3$ .............................................. C08G 59/44
[52] U.S. Cl. .................. 525/504; 525/331.9; 528/99; 528/109; 528/111; 528/119; 528/354; 528/361; 528/365; 528/367; 560/76; 560/91; 560/190; 560/198; 564/105
[58] Field of Search ............... 528/119, 367, 111, 109, 528/99, 354, 361, 365; 564/105; 560/91, 76, 190, 198; 525/331.9, 504

[56] References Cited

U.S. PATENT DOCUMENTS 4,168,364  9/1979  Seltzer et al. .................. 528/367 X
4,379,728  4/1983  Lin .................................. 528/367 X
4,384,084  5/1983  Lohse et al. ..................... 528/367 X Primary Examiner—Earl A. Nielsen
Attorney, Agent, or Firm—Richard P. Plunkett; William W. McDowell, Jr.

[57] ABSTRACT

This invention relates to novel N-cyano amide compositions and adducts thereof of the formula

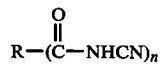

wherein R is a simple organic moiety or a polymeric adduct with the valence of n and n is 2 or 3. The composition, per se, can be used as a curing agent for epoxy resins to form a thermoset material on heating.

7 Claims, No Drawings

N-CYANO AMIDE COMPOSITIONS AND ADDUCTS THEREOF

BACKGROUND OF THE INVENTION

1. Field of the Invention

This invention relates to novel N-cyano amide compositions and adducts thereof. The composition, per se, can be used as a curing agent for epoxy resins to form a thermoset material on heating.

2. Description of Previously Published Art

It is known to react phenylcyanamide or butylcyanamide with epichlorohydrin to give 1,3-oxazolidines. See Cyanamides of Primary Aromatic Amines; New High-Performance Epoxy Curing Agents, E. H. Catsiff, H. B. Dee, J. F. DiPrima and R. Seltzer, ACS, Polymer Preprints, 22 (1), 111 (1981).

It is also known to heat benzoyl cyanamide to obtain tribenzoylmelamine. See W. Buddeus, J. Prakt Chem, 42, 82 (1890) and O. Diels, A. Wagner Ber., 45, 874 (1912).

3. Objects of the Invention

One object of the invention is to produce novel N-cyano amide compositions and adducts thereof. Another object of the invention is to produce a thermoset material using N-cyano amide compositions and adducts thereof as curing agents for epoxy resins. These and further objects will become apparent from a reading hereinafter.

SUMMARY OF THE INVENTION

N-cyano amide compositions and adducts thereof can be prepared from the reaction of cyanamide and the corresponding acid halides as described in the following equation:

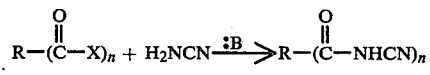

wherein X is a halide, R is a simple organic moiety or a polymeric adduct with the valence of n and n is 2 or 3. The composition, per se, can be used as a curing agent for epoxy resins to form a thermoset material on heating.

DESCRIPTION OF THE PREFERRED EMBODIMENTS

In general, the N-cyano amide compound is prepared by adding the corresponding polyfunctional acid halide dissolved in a water soluble solvent, such as 1,4-dioxane, N-methyl-2-pyrrolidone or N,N-dimethylformamide, to an aqueous alkaline solution of cyanamide at a temperature between 10° to 15°, said alkalinity being supplied by the addition of NaOH, KOH or other well known alkaline base. After reaction the solution is acidified by a concentrated acid such as hydrochloric acid to precipitate the product formed. The product usually precipitates as a crystalline solid. To summarize the preparation, the reactions can be represented by the following equations:

$$NaOH_{(aq)} + H_2NCN_{(aq)} \longrightarrow NaHNCN_{(aq)} + H_2O$$

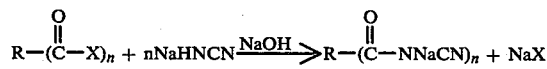

wherein X is a halide, R is a simple aliphatic or aromatic moiety or a polymeric adduct with the valence of n and n is 2 or 3.

Adducts terminated with N-cyano amide are also operable for curing epoxy resins and adjusting the properties of the final thermoset material. In general, a polymeric adduct is prepared by first reacting a simple aliphatic or aromatic diacid halide with a compound containing polyfunctional hydrogen-active moieties in a water soluble organic solvent such as N-methyl pyrrolidone, N,N-dimethylformamide or N,N-dimethyl acetamide at room temperature:

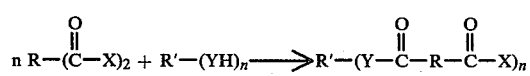

where R and R' are simple aliphatic or aromatic moieties, n is 2 or 3 and —YH can be —OH, —NH$_2$, —NH, —SH and the like. The acid halide terminated adduct is then reacted with cyanamide in the same manner as aforestated for the polyfunctional acid halide to form the desired N-cyanoamide terminated adduct:

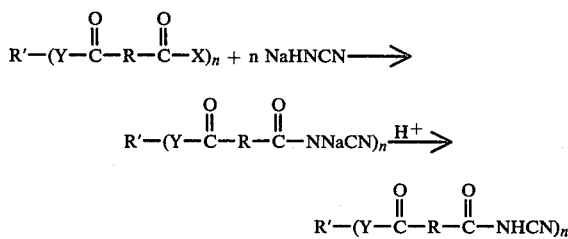

The acid halides used to form N-cyano amide compositions and adducts possess 2 or 3 functionalities. Examples of polyfunctional acid halide compounds used herein include, but are not limited to, terephthaloyl chloride, isophthaloyl chloride, phthaloyl chloride, 4,4'-dicarbonyl chloride biphenyl, 1,3,5-benzenetricarbonyl chloride, malonyl chloride, succinyl chloride, glutaryl chloride, adipyl chloride and pimelyl chloride.

The compounds [R'—(YH)$_n$] containing active hydrogen moieties for adduct preparation include, but are not limited to, amines, alcohols and thiols. For example, amines can be aliphatic tri- or diamines such as polyoxyethylene diamine, polyoxyethylene triamine, polyoxypropylene diamine and polyoxypropylene triamine or aromatic amines such as bis(4-aminophenyl) ether and bis(p-aminophenyl) sulfone. Representative alcohols include polyethylene glycol, glycerin, trimethylolpropane, polypropylene glycol and polycaprolactonediol. Polythiols operable herein to form the adducts include, but are not limited to, 2,2'-dimercaptodiethyl ether, glycol dimercaptoacetate, glycol dimercaptopropionate [ethylene bis(3-mercaptopropionate)], polyethylene glycol dimercaptoacetate, polyethylene glycol di(3-mercaptopropionate), trimethylolethane tri(3-mercaptopropionate), trimethylolethane trithioglycolate, trimethylolpropane tri(3-mercaptopropionate) and trimethylolpropane trithioglycolate.

The epoxy resin used herein to form a cured thermoset material comprises those materials possessing more than one epoxy group, i.e.,

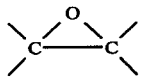

group. These compounds may be saturated or unsaturated, aliphatic, cycloaliphatic, aromatic or heterocyclic and may be substituted with substituents, such as chlorine hydroxyl groups, ether radicals and the like. They may be monomeric or polymeric.

For clarity, many of the polyepoxides and particularly those of the polymeric type are described in terms of epoxy equivalent values. That is, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

If the polyepoxides are single monomeric compounds having all of their epoxide groups intact, their epoxy equivalency will be whole integers, such as 1, 2, 3, 4 and 5. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like. The polyepoxides used in the present composition and process are those having an epoxy equivalency of at least 1.0.

Various examples of polyepoxides that may be used in the composition and process of this invention are given in U.S. Pat. No. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the composition and process of this invention include the epoxidized esters of unsaturated monohydric alcohols and polycarboxylic acids. For example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxy-dodecyl) maleate, di(2,3-epoxybutyl) tetraphthalate, di(2,3-epoxypentyl) thiodipropionate, di(5,6-epoxy-tetradecyl) diphenyldicarboxylate, di(3,4-epoxyheptyl) sulfonyldibutyrate, tri(2,3-epoxybutyl) 1,2,4-butane-tricarboxylate, di(5,6-epoxypentadecyl) tartarate, di(4,5-epoxytetradecyl) maleate, di(2,3-epoxybutyl)-azelate, di(3,4-epoxybutyl) citrate, di(5,6-epoxyoctyl cyclohexane-1,2-dicarboxylate,, di(4,5-epoxyoctadecyl) malonate.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether-A and Polyether-B described in the above-noted U.S. Pat. No. 2,633,458 are good examples of polyepoxides of this type. Other examples include the polyglycidyl ether of 1,1,2,2-tetrakis(4-hydroxyphenyl)ethane (epoxy value of 0.45 eq./100 g) and melting point 85° C., polyglycidyl ether of 1,1,5,5-tetrakis(hydroxyphenyl)pentane (epoxy value of 0.514 eq./100 g) and the like and mixtures thereof.

Additional examples of epoxy resins operable herein include, but are not limited to, diglycidyl isophthalate, diglycidyl phthalate, o-glycidyl phenyl glycidyl ether, diglycidyl ether of resorcinol, triglycidyl ether of phloroglucinol, triglycidyl ether of methyl phloroglucinol, 2,6-(2,3-epoxypropyl)phenylglycidyl ether, [4-(2,3-epoxy)propoxy-N,N-bis(2,3-epoxypropyl)]aniline, 2,2-bis[p-2,3-epoxypropoxy)phenyl]-propane, diglycidyl ether of bisphenol-A, diglycidyl ether of bisphenol-hexafluoroacetone, diglycidyl ether of 2,2-bis(4-hydroxyphenyl)nonadecane, diglycidyl phenyl ether, triglycidyl 4,4-bis(4-hydroxyphenyl)pentanoic acid, diglycidyl ether of tetrachlorobisphenol-A, diglycidyl ether of tetrabromobisphenol-A, triglycidyl ether of trihydroxybiphenyl, tetraglycidoxy biphenyl, [tetrakis(2,3-epoxypropoxy)diphenylmethane], [2,2',4,4'-tetrakis(2,3-epoxypropoxy)benzophenone, 3,9-bis[2,3-epoxypropoxy)phenylethyl]-2,4,8,10-tetraoxaspiro[5,-5]undecane, triglycidoxy-1,1,3-triphenylpropane, tetraglycidoxy tetraphenylethane, polyglycidyl ether of phenolformaldehyde novolac, polyglycidyl ether of o-cresol-formaldehyde novolac, diglycidyl ether of butanediol, di(2-methyl)glycidyl ether of ethylene glycol, polyepichlorohydrin di(2,3-epoxy-propyl)ether, diglycidyl ether of polypropylene glycol, epoxidized polybutadiene, epoxidized soybean oil, triglycidyl ether of glycerol, triglycidyl ether of trimethylol-propane, polyallyl glycidyl ether, 2,4,6,8,10-pentakis-[3-(2,3-epoxypropoxy)propyl]2,4,6,8,10-pentamethylcyclopentasiloxane, diglycidyl ether of chlorendic diol, diglycidyl ether of dioxanediol, diglycidyl ether of endomethylene cyclohexanediol, diglycidyl ether of hydrogenated bisphenol-A, vinylcyclohexene dioxide, limonene dioxide, dicyclopentadiene dioxide, p-epoxycyclopentenylphenyl glycidyl ether, epoxydicyclopentenylphenyl glycidyl ether, o-epoxycyclopentenylphenylglycidyl ether, bis-epoxydicyclopentyl ether of ethylene glycol, [2-3,4-epoxy)cyclohexyl-5,5-spiro(3,4-epoxy)-cyclohexane-m-dioxane], 1,3-bis[3-(2,3-epoxypropoxy)propyl]tetramethyldisiloxane, epoxidized polybutadiene, triglydicdyl ester of linoleic trimer acid, epoxidized soybean oil, diglycidyl ester of linoleic dimer acid, 2,2-bis[4-(2,3-epoxypropyl)cyclohexyl]propane, 2,2-(4-[3-chloro-2-(2,3-epoxypropoxy)propolyl]cyclohexyl)propane, 2,2-bis(3,4-epoxycyclohexyl)propane, bis(2,3-epoxycyclopentyl)ether(liquid isomer), bis(2,3-epoxycyclopentyl)ether(solid isomer), 1,2-epoxy-6-(2,3-epoxypropoxy)hexahydro-4,7-methanoindane, 3,4-epoxycyclohexylmethyl-(3,4-epoxy)cyclohexane carboxylate, 3,4-epoxy-6-methylcyclohexylmethyl-4-epoxy-6-methylcyclohexane carboxylate and bis(3,4-epoxy-6-methylcyclohexylmethyl)adipate. Tri- and tetra-functional epoxides such as triglycidyl isocyanurate and tetraphenylolethane epoxy are also operable herein.

The equivalent ratio of epoxide to N-cyano amide can vary between wide limits. Operable herein is an equivalent ratio of epoxide:N-cyano amide of 1 to 30:2, peferably 10:1, which results in a thermoset material on heating. Furthermore, in order to obtain a thermoset material, there has to be more than 1 N-cyano amide group present.

The curing reaction is carried out at a temperature in the range 100°–200° C.

The following examples are set out to explain, but expressly not limit, the instant invention. Unless otherwise noted, all parts and percentages are by weight.

Strength properties of adhesive in shear by tension loading (metal to metal) were run in accord with ASTMD 1002-64 based on 1" square of lapped area.

EXAMPLE 1

To a solution of 16.8 g of cyanamide in 50 ml of water was added 50 ml of aqueous 3 N sodium hydroxide. To this solution, cooled to 15° C., was added dropwise a solution of 20.3 g of isophthaloyl chloride in 100 ml of dioxane over a period of an hour with agitation. Another 50 ml of aqueous 3 N sodium hydroxide was added at a rate so as to finish the addition at the same time as the isophthaloyl chloride addition. After addition the reaction mixture was stirred for an hour and then 100 g of cracked ice was added. The mixture was acidified by the slow addition of concentrated hydrochloric acid with stirring. The N,N'-dicyanoisophthalamide product was collected in crystal form, washed with water and dried in vacuum.

EXAMPLE 2

10 g of Epon-828 (a diglycidyl of bisphenol-A from Shell Chemical) was mixed with 4 g of N,N'-dicyanoisophthalamide from Example 1 to give a stable, viscous dispersion. After heating at 140° C. for an hour, a rigid, transparent, yellow material was obtained.

EXAMPLE 3

Example 1 was repeated except that 20.3 g of terephthaloyl chloride was substituted for the isophthaloyl chloride in Example 1. N,N'-dicyanoterephthaloyl amide product in crystalline form was obtained.

EXAMPLE 4

Example 1 was repeated except that phthaloyl chloride (20.3 g) was substituted for the isophthaloyl chloride in Example 1. The resulant product, i.e., N,N'-dicyanophthalamide product in crystalline form was obtained in good yield.

EXAMPLE 5

Preparation of an N-Cyano Amide Adduct

A polyoxypropylenediamine (40 g) having a molecular weight of 400 g/mole, commercially available from Texaco, was added dropwise to a solution containing 40.1 g of terphthaloyl chloride dissolved in 200 ml of N,N-dimethyl formamide. The reaction was continued for 2 hours after the addition of the polyoxypropylenediamine. This reaction solution, i.e., solution A, was then added slowly into an aqueous alkaline solution containing 16.8 g of cyanamide, 67 ml of water and 67 ml of 3 N NaOH solution while simultaneously solution B, i.e., 67 ml of 3 N NaOH aqueous solution, was also added to the cyanamide solution at a rate to finish the addition at the same time as the addition of solution A. The reaction was carried out at temperatures between 10° to 15° C. The reaction mixture was acidified with concentrated hydrochloric acid and crushed ice was added to keep the temperature below 15° C. After standing for 2 hours in a refrigerator, the precipitate was collected and added to acetone. The precipitate that dissolved in acetone was collected. After removing acetone and drying in a vacuum, a viscous liquid was obtained. This viscous liquid showed the desired absorptions at 2,250 cm$^{-1}$ and 2,160 cm$^{-1}$ for —C≡N group, 1,645 cm$^{-1}$ for amide group and 1,100 cm$^{1}$ for polyether linkages.

EXAMPLE 6

The viscous liquid adduct (3.4 g) from Example 5 was mixed with 3.8 g of Epon-828. After being cured at 170° C. for an hour, the liquid changed to a rigid strong material.

EXAMPLE 7

The admixture from Example 2 was applied in a 3 mil-thickness between 2 cold rolled steel substrates in a ½" lap joint. The substrates were clamped together and heated for 1 hour at 150° C. Upon removal of the clamps the lap shear strength was 1,263 psi.

EXAMPLE 8

Example 7 was repeated using the mixture of Example 6. The lap shear strength was 3,780 psi.

EXAMPLE 9

The admixture from Example 2 was coated to a 1 mil thickness by a drawbar on an aluminum substrate. The thus coated substrate was placed in an oven at 140° C. for 1 hour. A transparent, rigid coating resulted.

The N-cyano amide compositions and adducts thereof can be used in conjunction with epoxy resins to form coatings, sealants, adhesives, electron potting compounds and composites with graphite or glass fibers.

I claim:
1. N-cyano amide compositions and adducts thereof of the formula:

$$R\text{—}(\overset{\overset{\displaystyle O}{\|}}{C}\text{—}NHCN)_n$$

wherein R is an aromatic moiety or a polymeric adduct with the valence of n and n is 2 or 3.

2. A heat curable composition comprising N-cyano amide compositions and adducts thereof of the formula:

$$R\text{—}(\overset{\overset{\displaystyle O}{\|}}{C}\text{—}NHCN)_n$$

wherein R is an aromatic moiety or a polymeric adduct with the valence of n and n is 2 or 3 and an epoxy resin.

3. The composition of claim 2 wherein the equivalent ratio of epoxy groups in the epoxy resin to N-cyano amide is in the range 1 to 30:2.

4. The composition of claim 2 as a coating.
5. The composition of claim 2 as an adhesive.
6. The composition of claim 2 as a sealant.
7. The method of curing an epoxy resin containing more than one epoxy group to a thermoset material which comprises admixing said resin with N-cyano amide compositions and adducts thereof of the formula:

$$R\text{—}(\overset{\overset{\displaystyle O}{\|}}{C}\text{—}NHCN)_n$$

wherein R is an aromatic moiety or a polymeric adduct with the valence of n and n is 2 or 3 and thereafter heating the admixture at a temperature in the range 100°–200° C.

* * * * *